United States Patent [19]
Suemoto et al.

[11] Patent Number: 6,151,067
[45] Date of Patent: Nov. 21, 2000

[54] MONITOR WITH CONNECTOR FOR DETECTING A CONNECTIVE STATE

[75] Inventors: Kazunori Suemoto; Yoshio Nakane; Koichi Yahagi; Akihiro Suzuki; Kouzo Kokubun; Masatsugu Fujii, all of Asaka, Japan

[73] Assignee: Fuji Photo Film Co., Ltd., Kanagawa, Japan

[21] Appl. No.: 09/020,384

[22] Filed: Feb. 9, 1998

Related U.S. Application Data

[62] Division of application No. 08/362,165, Dec. 22, 1994, Pat. No. 5,844,606.

[30] Foreign Application Priority Data

Mar. 3, 1994 [JP] Japan ...................................... 6-033808

[51] Int. Cl.$^7$ .................................................. H04N 5/222
[52] U.S. Cl. .......................... 348/207; 348/372; 348/375
[58] Field of Search ..................................... 348/207, 333, 348/334, 373, 374, 375, 376, 372, 211; 396/373, 374, 281, 296, 301, 429, 430; 345/156; H04N 5/225

[56] References Cited

U.S. PATENT DOCUMENTS

| | | | |
|---|---|---|---|
| 4,797,737 | 1/1989 | Yazawa | 348/65 |
| 4,945,424 | 7/1990 | Hiroki et al. | 348/333 |
| 5,341,171 | 8/1994 | Mori et al. | 348/373 |
| 5,465,117 | 11/1995 | Ide et al. | 348/373 |
| 5,576,841 | 11/1996 | Hieda et al. | 386/46 |
| 5,584,070 | 12/1996 | Harris et al. | 455/346 |
| 5,696,555 | 12/1997 | Kashimura | 348/316 |

FOREIGN PATENT DOCUMENTS

| | | | |
|---|---|---|---|
| 3-132179 | 6/1991 | Japan | H04N 5/225 |
| 6-303478 | 10/1994 | Japan | H04N 5/225 |

*Primary Examiner*—Tuan Ho
*Attorney, Agent, or Firm*—Sughrue, Mion, Zinn, Macpeak & Seas, PLLC

[57] ABSTRACT

A connector adapted to detect a connective state is disposed in a monitor having a video input terminal and display. The detector detects the presence of an external video output connected to the video input terminal. When a video input it detected, a power controller enables the video display; however, if no connection is detected to the monitor input, power to the display is disabled. According to one embodiment the detector determines the connective state based on the presence of a video signal input from the video input terminal. In yet another embodiment the control signal terminal is provided for connection with a video camera. In addition, video operation switch and output for controlling the video camera are also provided. Finally, the monitor may include an infrared controller for sending control signals to control the operation of the video camera.

12 Claims, 14 Drawing Sheets

MONITOR WITH CONNECTOR FOR DETECTING A CONNECTIVE STATE

This is a divisional of application Ser. No. 08/362,165 filed Dec. 22, 1994 now U.S. Pat. No. 5,844,606.

BACKGROUND OF THE INVENTION

1. Field of the Invention

This invention relates to a method of assembling a videocamera and, more particularly, to the operation and function of a camera body which connects to various accessories including a station.

2. Description of the Related Art

The videocamera, in recent years, has been getting smaller and a camera integral-type VTR (Video Tape Recorder) combined with a camera and a video tape recorder in one body has become common. The camera integral-type VTR includes not only a record function for video taping but also a play back function.

The functions of the camera body are capable of being utilized effectively because it includes a video I/O (input-output) terminal and S-video I/O terminal to input and output a video signal from the external apparatus, an audio I/O terminal to input and output an audio signal from the external apparatus, a microphone input terminal to input the audio signal from an external microphone and a remote terminal and they are connected with terminals that have various accessories, such as a television system, station, external camera, monitor, monitor remote controller, and marine package.

When the above-mentioned various accessories, however, are connected, a lot of terminals would be required and the functioning of the camera body would be difficult. The operation would also be difficult due to the changeover of the operation mode in accordance with what accessories would be used.

For example, if the camera body is connected to a station in order to use the camera body as a stationary VTR, the operation mode of the camera body would not be used in the camera mode but in the VTR mode. Therefore, the operation mode would be required in order to change to the VTR mode. Also, the operation mode of the camera body is required to change to the VTR mode, when the camera body is connected to an external camera (a zoom camera) without a VTR function to use the camera body as a video tape recorder. If the camera body is placed in the marine package, the external microphone of marine package is required to connect with the microphone input of the camera body and an internal microphone in the camera body is required to change to the external microphone.

In a possible case of double operation when using the function buttons provided both on the camera body and the monitor remote controller or above-mentioned accessories connected with the camera body, some unexpected problems might be caused. A portable monitor, monitor remote controller or the like which have an external input terminal and are provided for displaying video by a liquid crystal display thereof is expected to switch its monitor power ON or OFF state by means of a power switch to save electric power when not used. If a camera is used with an external monitor which has a loudspeaker and electrically and structurally attached to the camera so as to be used to confirm actual pictures being taped (finder), there will take place so-called a howling sound since there is a short distance between a microphone of the camera and the loudspeaker of the external monitor.

SUMMARY OF THE INVENTION

The present invention was devised in view of these past deficiencies and the object of this invention is to provide a videocamera which can improve the facility and the operation by defining the operation mode of the camera body automatically in accordance with a variety of connected accessories and limiting the operation of the camera body when the accessories are connected with the camera body, whereby its function is improved.

The other objects of this invention are to decrease the consumed electric power by controlling a monitor power, ON/OFF automatically and to supply a monitor which can prevent howling in the case of utilizing as it a finder.

To attain the above-mentioned object, the videocamera which can connect the accessories with the camera body is comprising AV(audio visual) terminals which input and output a video signal and an audio signal from an external device, multi-connector connecting the accessories in the videocamera which controls I/O of the video signal and the audio signal against the above-mentioned AV terminals in accordance with a designated operation mode among multiple operation modes including a camera mode and VTR mode and including accessory recognition terminal which recognizes the above-mentioned AV terminals and the variety of the accessories, and means for selecting a workable operation mode from said multiple operation modes based on the recognized information designating the variety of the accessories which are inputted through the accessory recognition terminal of said multi-connector.

The videocamera is comprising the camera body including the first multi-connector which contains a first AV terminal, a power input terminal and a control signal terminal for inputting and outputting the video signal and audio signal into the external apparatus and the station comprising a second multi-connector being connected with the above-mentioned first multi-connector and including the second AV terminal, the power output terminal and the control signal terminal for inputting and outputting the video signal and audio signal into the above-mentioned camera body, a third AV terminal for inputting and outputting the video signal and audio signal into the external apparatus, an operation switch used for controlling in the case of VTR mode at least, and means for outputting a control signal into the above-mentioned control signal terminal in accordance with a control of the control signal, the above-mentioned station outputting, in which the control signal and the operation switch are outputted from the video signal, audio signal and the above-mentioned control means inputted from the above-mentioned third AV terminal and the video signal and audio signal outputted from the AV terminal of the above-mentioned camera body are outputted into the above-mentioned third AV terminal.

Furthermore, the monitor relating to the present invention is comprising a video input terminal for inputting the video signal, a detecting means for detecting a connected condition of the video input terminal and a video output terminal of the external apparatus, display means for displaying an image based on the video signal inputted from the above-mentioned video input terminal, and an electric control means for having the above-mentioned display means display the image when the connected condition of the above-mentioned video input terminal is detected by the above-mentioned detecting means and for putting off the power switch of the above-mentioned display means at least when not detecting the connected condition of the above-mentioned video input terminal by the above-mentioned detecting means.

Furthermore, the video camera is comprising the AV terminal for outputting the video signal and audio signal into the external apparatus, the camera body possessing the first multi-connector including the control signal terminal outputting information designating the accessory recognition terminal and at least the operation mode, the camera mode or VTR mode, the second multi-connector possessing terminals connected with the above-mentioned first multi-connector AV terminal, the accessory recognition terminal and the control signal terminal respectively, the display means displaying the image based on the video signal inputted from the above-mentioned AV terminals, the monitor is usable as the finder possessing a loudspeaker producing a sound based on the audio signal inputted from the above-mentioned AV terminals, and mute means in which the camera body outputting the video signal and audio signal from the above-mentioned AV terminals when detecting that the above-mentioned monitor is connected with the above-mentioned first multi-connector based on the recognized information inputted from the above-mentioned accessory recognition terminal and the above-mentioned monitor muffling sounds from the above-mentioned loudspeaker when the signal designating the above-mentioned camera mode is inputted from the above-mentioned control signal terminal.

According to the present invention, when the accessories are connected with the camera body through the multi-connector, the camera body recognizes what kind of accessories are connected based on the recognition information which is designated by the variety of the accessories inputted from the accessories recognition terminal of the multi-connector. The operation mode fitted to the connected accessories is selected automatically among the plural operation modes including the camera mode and VTR mode. Accordingly, an operation and others to switch the operation mode which is not necessary because of the operation switch on the camera body side.

The first multi-connector of the camera body and the second multi-connector of the station are connected, of which connection the camera body detects, and changes to the VTR mode, and thereafter the video signal and audio signal inputted and outputted from the camera body by the control signal from the station is controlled. Furthermore, ON/OFF control of the monitor is performed based on the connected condition of the video input terminal of the monitor and thereafter the consumed electric power of the monitor can be decreased.

Furthermore, when the first multi-connector of the camera body and the monitor are usable when the finder is connected, of art which connection the camera body recognizes, the camera body outputs the video signal and audio signal from the AV terminals and the monitor inputs a signal designating the camera mode from the control signal terminal, muting the sound from the built-in loudspeaker. Therefore, the howling noise is prevented when taking pictures.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereafter be given of the preferred embodiment of a videocamera according to the present invention with reference to the accompanying drawings.

Figure 1:
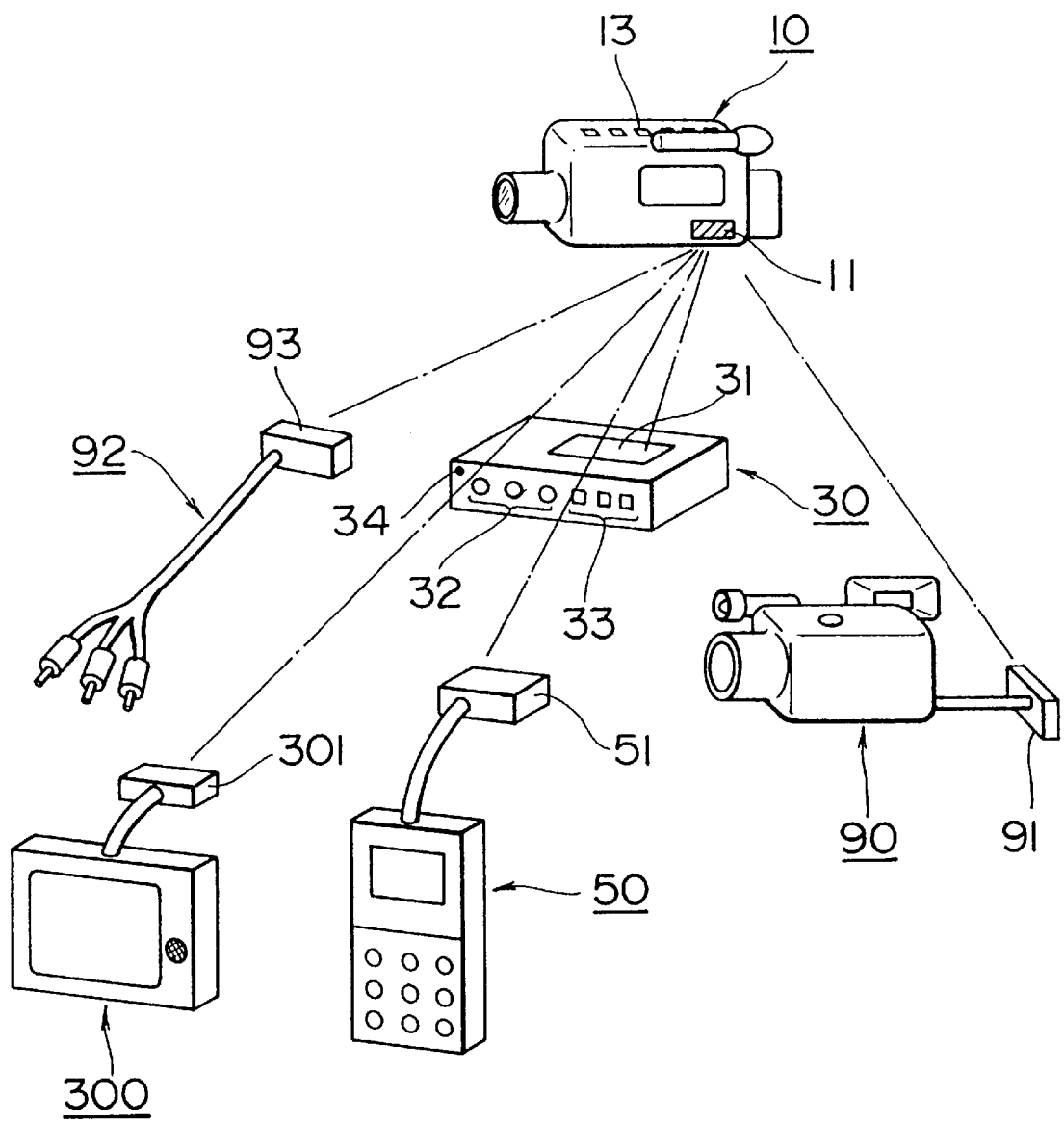
FIG. 1 is a diagrammatic view of the videocamera related to this present invention and the accessories connecting with the videocamera.

FIG. 1 is a schematically view showing a videocamera in accordance with the present invention and various accessories capable of connecting therewith. The reference numerals in the drawing are used to designate several components, for example, a camera body by 10, station by 30, monitor remote controller by 50, zoom camera by 90, AV connector by 92, and liquid crystal monitor by 300.

As can be seen from the drawing, the camera body 10 is provided thereon with a multi-connector 11 to be connected with several accessories, such as a station 30, monitor remote controller 50, zoom camera 90, AV connector 92, marine package (not-shown), and liquid crystal monitor 300. Incidentally, the mentioned station 30, monitor remote controller 50, zoom camera 90, AV connector 92 and liquid crystal monitor 300 have multi-connectors 31, 51, 91, 93 and 301 respectively to be connected with the multi-connector 11 of the camera body 10.

The multi-connector 11 of the camera body 10 consists of power/ground terminal, audio/picture I/O terminal (AV terminal), remote control (LANC I/O) terminal, and accessories recognition terminal.

The accessories recognition terminal consists of, for example, a 3 way-terminal to which accessories recognition signals (S0, S1, S3) combined with respective terminal levels (H-level, L-level) are inputted. Accordingly, the camera body 10 can recognize what accessories are connected to the multi-connector 11 based on the accessories recognition signal inputted from the mentioned accessories recognition terminal.

It can be understood that the accessories recognition signals (S0, S1, S2) are characteristic of respective accessories as shown in following Table 1.

TABLE 1

|  | S0 | S1 | S2 | AV I/O | OPERATION |
|---|---|---|---|---|---|
| NO-ACCESSORIES | H | H | H | AUTO | BODY |
| AV CONNECTOR | H | H | H | AUTO | BODY |
| STATION | H | L | H | AUTO | BODY INEFFECTIVE |
| MONITOR REMOCON DEVICE | L | H | H | AUTO | BODY INEFFECTIVE |
| ZOOM CAMERA | H | H | L | A/V:LINE IN | BODY INEFFECTIVE |
| MARINE PACKAGE | H | L | L | A:LINE IN V:LINE OUT | BODY INEFFECTIVE |
| LIQUID CRYSTAL MONITOR | L | L | H | AUTO | BODY |

Figure 2:
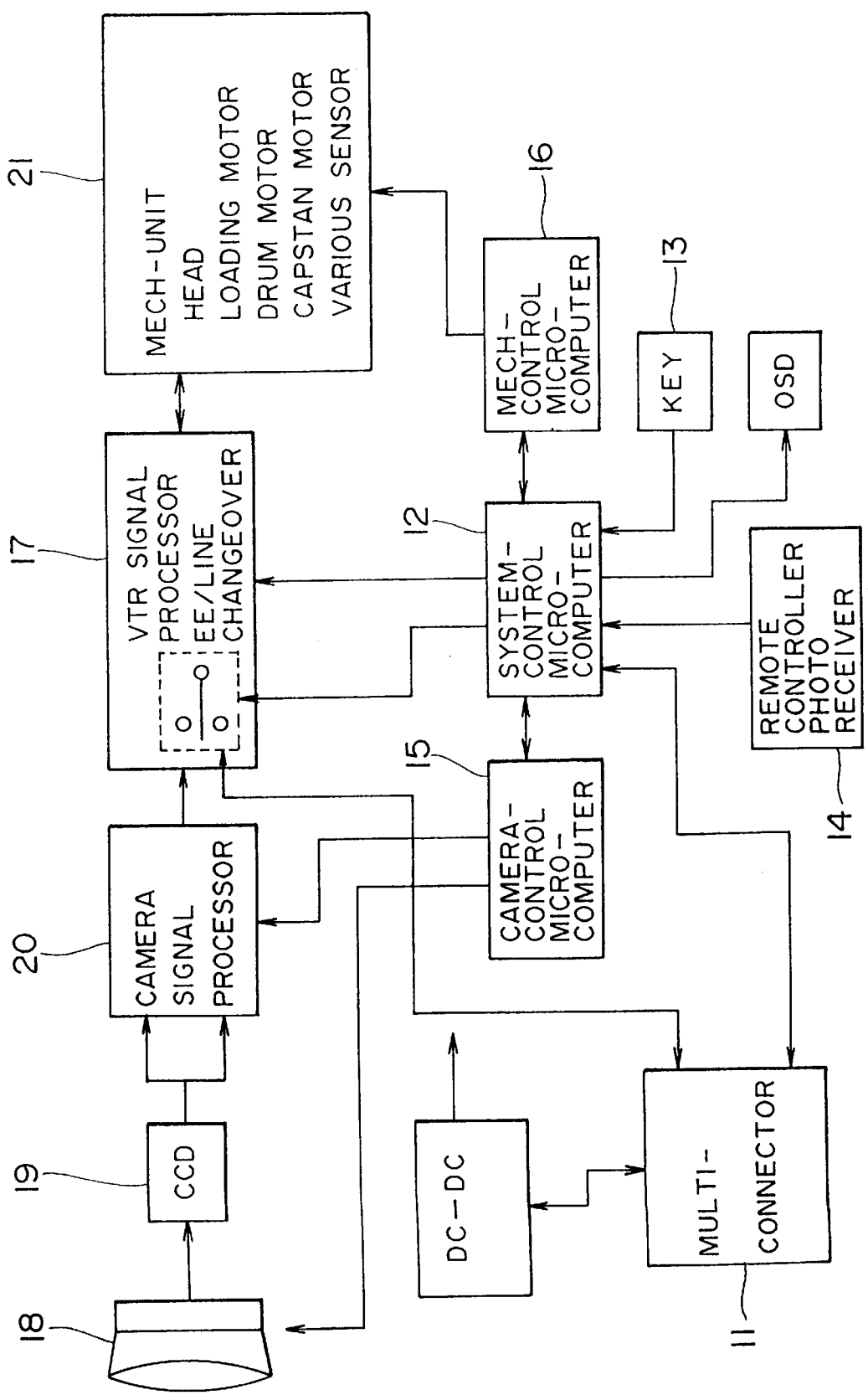
FIG. 2 is a block diagram of one embodiment of the videocamera shown in FIG. 1.

As shown in Table 1, all of the accessories recognition signals (S0, S1, S2) become "H" only when the basic function of the camera body will not be changed without accessories or with the AV connector, otherwise at least one of those signals (S0, S1, S2) will become "L" due to some accessories connected to the camera body. The respective multi-connectors of the station, monitor remote controller, zoom camera, marine package, and liquid crystal monitor are provided to send out such accessories recognition signals to the camera body. Incidentally, in Table 1, the expression of "AUTO" means that the camera body 10 controls AV I/O with reference to an operation mode automatically. The expression of "BODY INEFFECTIVE" means an ineffective state of an operation switch of the camera body 10 and a receiving operation of an infrared remote control receiver. The details of the camera body 10 will hereafter be explained in detail. FIG. 2 is of a block diagram explaining the components of the above-explained camera body 10.

As is shown in the drawing, there is provided a system-control microcomputer 12 to receive control signals from a multi-connector 11, operation switch 13 and remote controller photo receiver 14. The system-control microcomputer 12 controls function and operation of the camera body based on the input control signal and it transmits/receives signals between a camera-control microcomputer 15 or a mech-control microcomputer 16 and send control signals to a VTR signal processor 17. The camera-control microcomputer 15 controls a camera lens 18 and a camera signal processor 20 and the mech-control microcomputer 16 controls a VTR mech-unit 21 and conducts servo control of a drum motor, loading motor and capstan motor.

When no accessories are connected to the multi-connector 11 or the AV connector, the function of the camera body will not be changed.

When the camera mode is selected by pushing an operation switch 13 or the like to start recording upon a recording start/stop button, a subject can be focused into an image at a CCD 19 through the camera lens 18, whereby the image is in a photoelectric conversion to be outputted to a camera signal processor 20. The camera signal processor 20 includes a sample hold circuit, white balance circuit, γ corrective circuit, encoder circuit and so on to output video signal in a certain format to the VTR signal processor 17. The VTR signal processor 17 converts video signals sent from the camera signal processor 20 into recording signal applicable to a magnetic recording. The recording signal is further sent to a head of the mech-unit 21 through a recording amplifier to be recorded in a videotape.

When the VTR mode is selected and a play back button is pushed, the recording signal is read out from the VTR mech-unit 21 and the video signal can be decoded by the VTR signal processor 17. The video signal is outputted into an external apparatus such as the television system through the multi-connector 11 to play back. Incidentally, not only in the above-mentioned play back process, but also upon a button operation for recording, forwarding or reversing the video tape, the corresponding process will be taken place. The audio signal is naturally recorded/played back as the video signal.

It will hereafter be explained in detail of the multi-connector 11 of the camera body which connects with the multi-connector 31 of station 30.

Figure 3:
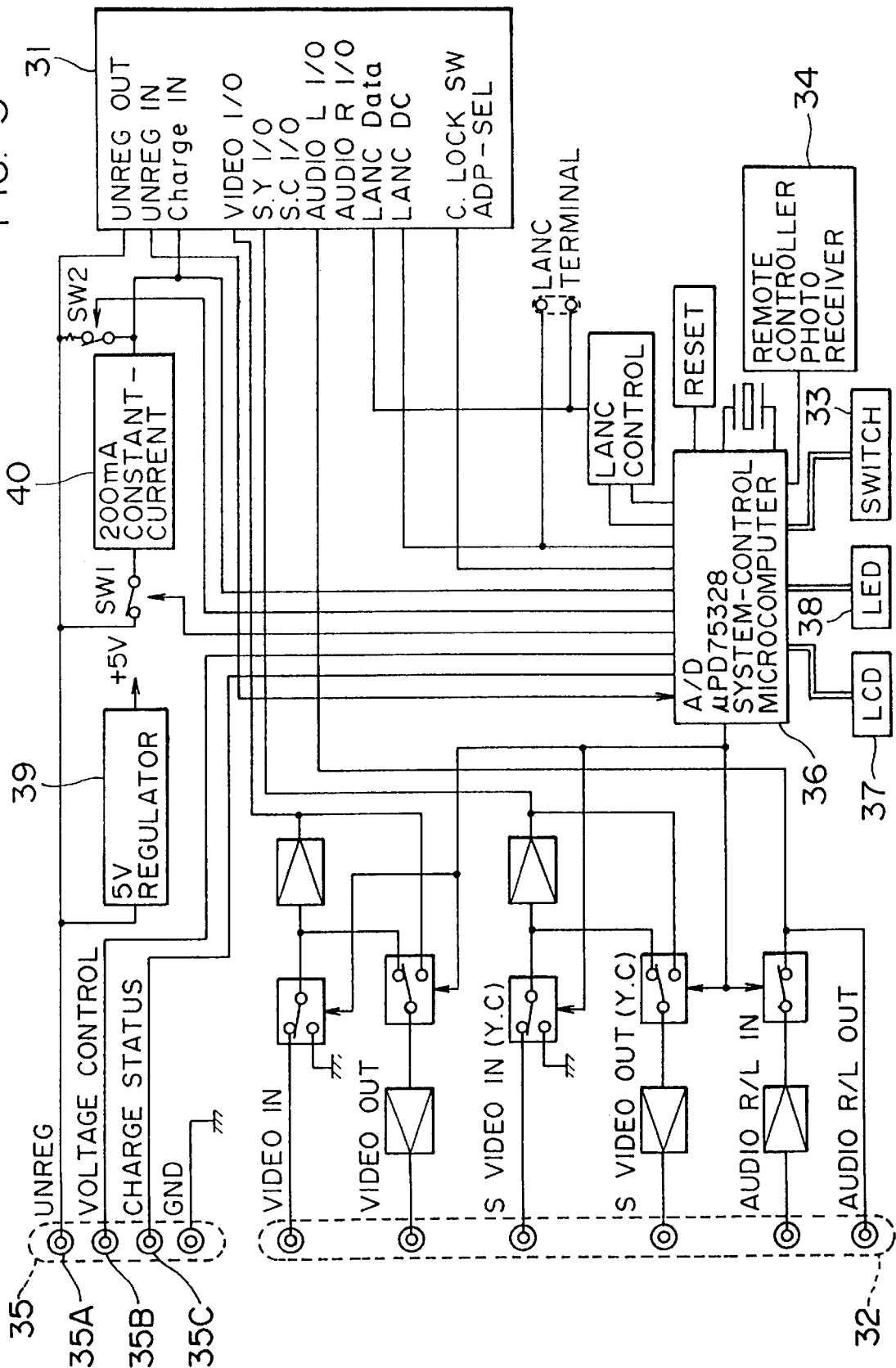
FIG. 3 is a block diagram of one embodiment of the station shown in FIG. 1.

As shown in FIG. 3, the station 30 connecting the non-shown camera body 10 and a television system, a video tape recorder and so on are composed by the multi-connector 31, AV terminal 32, operation switch 33, remote controller photo receiver 34, power connector 35, system-control microcomputer 36, and others.

The multi-connector 31 of the station 30 is structured to be connected to the multi-connector 11 of the camera body 10 as the camera body 10 is loaded. The AV terminal 32 including a video input terminal, video output terminal, S-video input terminal, S-video output terminal, stereo audio input terminal, stereo audio output terminal and so on are connected to the television system, the power connector, 35 and others is connected to an AC adaptor 41 (see FIG. 4).

The multi-connector 31 of the station 30 consists of the AV terminal (the video I/O terminal, S-video I/O terminal, stereo audio I/O terminal), power I/O terminal(UNREG OUT, Charge IN), camera body connection detect terminal(UNREG OUT, UNREG IN), remote control terminal-(LANC Data), camera power ON/OFF recognition terminal(LANC DC), cassette cover OPEN/CLOSE detection terminal(C.LOCK SW), and accessories recognition terminal(ADP-SEL).

When the multi-connector 31 is connected with the multi-connector 11 of the camera body, the camera body connection detect terminal (UNREG) from UNREG IN through the camera body 10.

The remote control terminal (LANC I/O terminal) is such a terminal as bi-directional serial bus communication for the 8-byte LANC signal of remote control every vertical synchronizing signal by synchronizing with vertical synchronizing signal, whereupon 8-byte manifests that the first 2-byte of all is for a remote control command from the accessories side (the station side) to the camera body side and the last 4-byte of all is for information of a tape count value, operation mode or so on send from the camera body side to the station side. The camera power ON/OFF recognition terminal(LANC DC) inputs signal as shown in following Table 2 in accordance to the ON/OFF of camera power.

TABLE 2

|  | LANC DC | LANC OUT |
| --- | --- | --- |
| State of camera power OFF | 0 V | HIGH (Pull UP) |
| State of camera power ON | UNREG | LANC signal |

The cassette cover OPEN/CLOSE detect terminal-(C.LOCK SW) is a terminal for inputting a signal from a switch for detecting the state of cassette cover OPEN/CLOSE of the camera body and the accessories recognition terminal( ADP-SEL) is a terminal for being programmed to be (H, L, H) of the 3-bit accessories recognition signal(S0, S1, S2) as is known from the Table 1, that is, only S1 will become L-level.

The VTR mode will become capable of operation but an operation switch and infrared remote control receiver of camera body will become incapable of operation when the camera body 10 perceives the station 30 connecting to the multi-connector 11 base on the accessories recognition signal inputting through the accessories recognition terminal-(ADP-SEL), so that the camera body 10 is controlled by the control a signal from the operation switch 33 or the remote controller photo receiver 34 of the station. The station 30 can control functions which are not in the switches of the camera body. In this case, the camera body supplies only functions and can omit a switch and other for miniaturization and operation.

In operating the VTR mode, a system-control microcomputer 36 of station 30 automatically changes the directions of an AV I/O from an AV terminal 32 (AV input terminal, AV output terminal) of the station 30 and the AV I/O from the camera body 10 based on the operation. In operating a play back, signal runs from the AV I/O terminal of the camera body 10 to the AV output terminal of the station 30 and in other operation signals are changed from the AV input terminal of station 30 to the AV output terminal of the station and the AV I/O terminal of the camera body 10 side.

Figure 4:
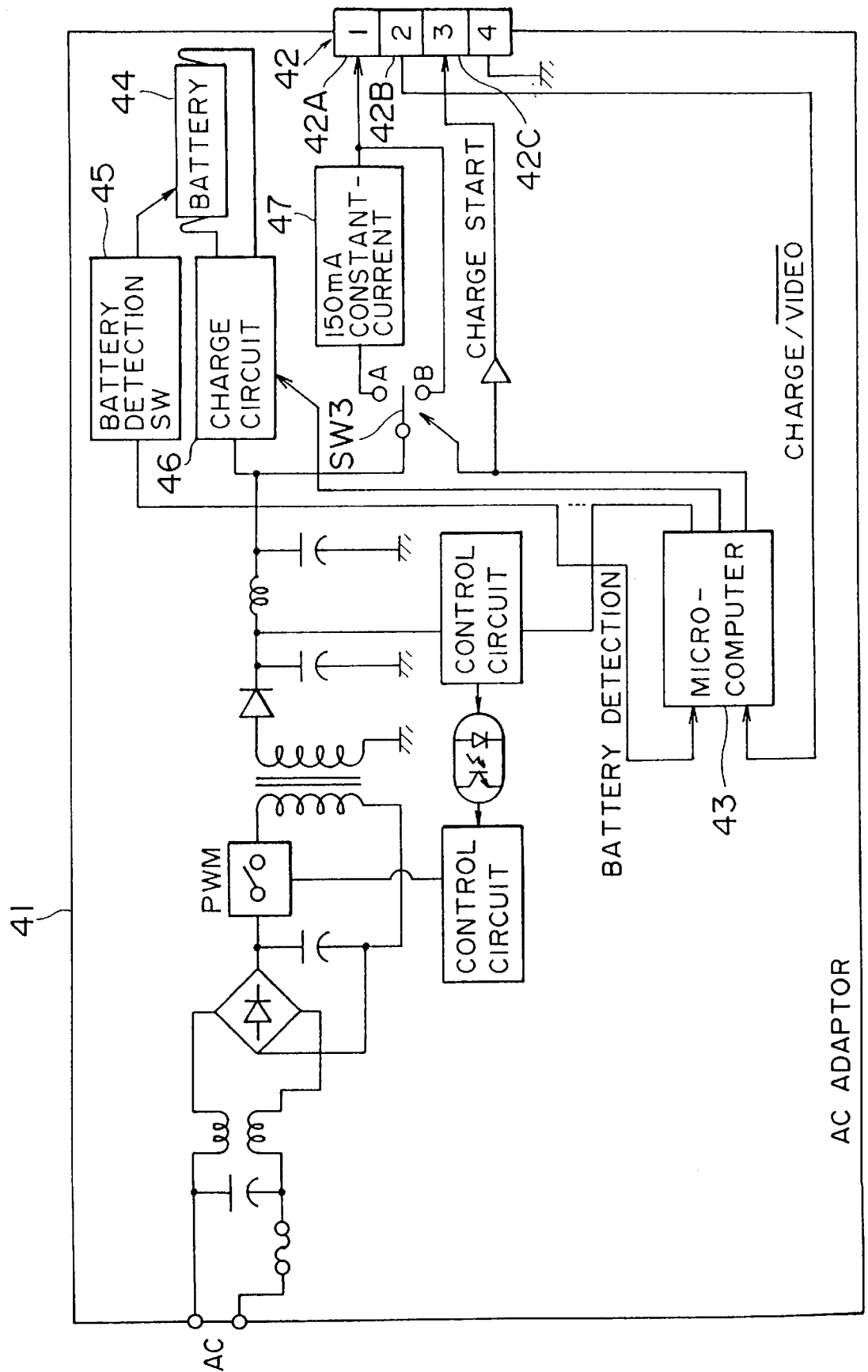
FIG. 4 is a block diagram of one embodiment of the AC adaptor connected with the station shown in FIG. 3.

FIG. 4 is a block diagram explaining one embodiment of the AC adaptor 41. As is known from the drawing, a connector 42 of AC adaptor 41 is connected to the power connector 35 of the station 30. The AC adaptor 41 outputs a signal reporting a charging extent through the connector 42C, 35C in conjunction with supplying power through the connector 42A, 35A to the station 30, while the station 30 outputs a mode signal through connector 35B, 42B to the AC adaptor 41 designating a charge mode or video mode. The station 30 causes the mode signal to become "H" due to the charge mode in the camera power OFF and to become "L" due to the video mode in the camera power ON.

While the mode signal for charge mode is inputted and a battery 44 in active is detected by a battery detection switch 45, a microcomputer 43 of AC adaptor 41 causes the battery 44 to charge rapidly with operating a charge circuit 46 and at the same time changes a switch SW3 to a 150 mA of constant-current circuit 47 side (contact A) to check the flow of too much electric current to the station 30. A Signal for charging a battery 44 is outputted to the station 30 through the connector 42C, 35C. A regulator 39 in the station 30 produces a reference voltage with power inputting from the AC adaptor 41 and outputs the reference voltage to the system-control microcomputer 36 and others, but the operation of system-control microcomputer 36 and others is secured even by power controlled electric current through the constant-current circuit 47.

Figure 5:
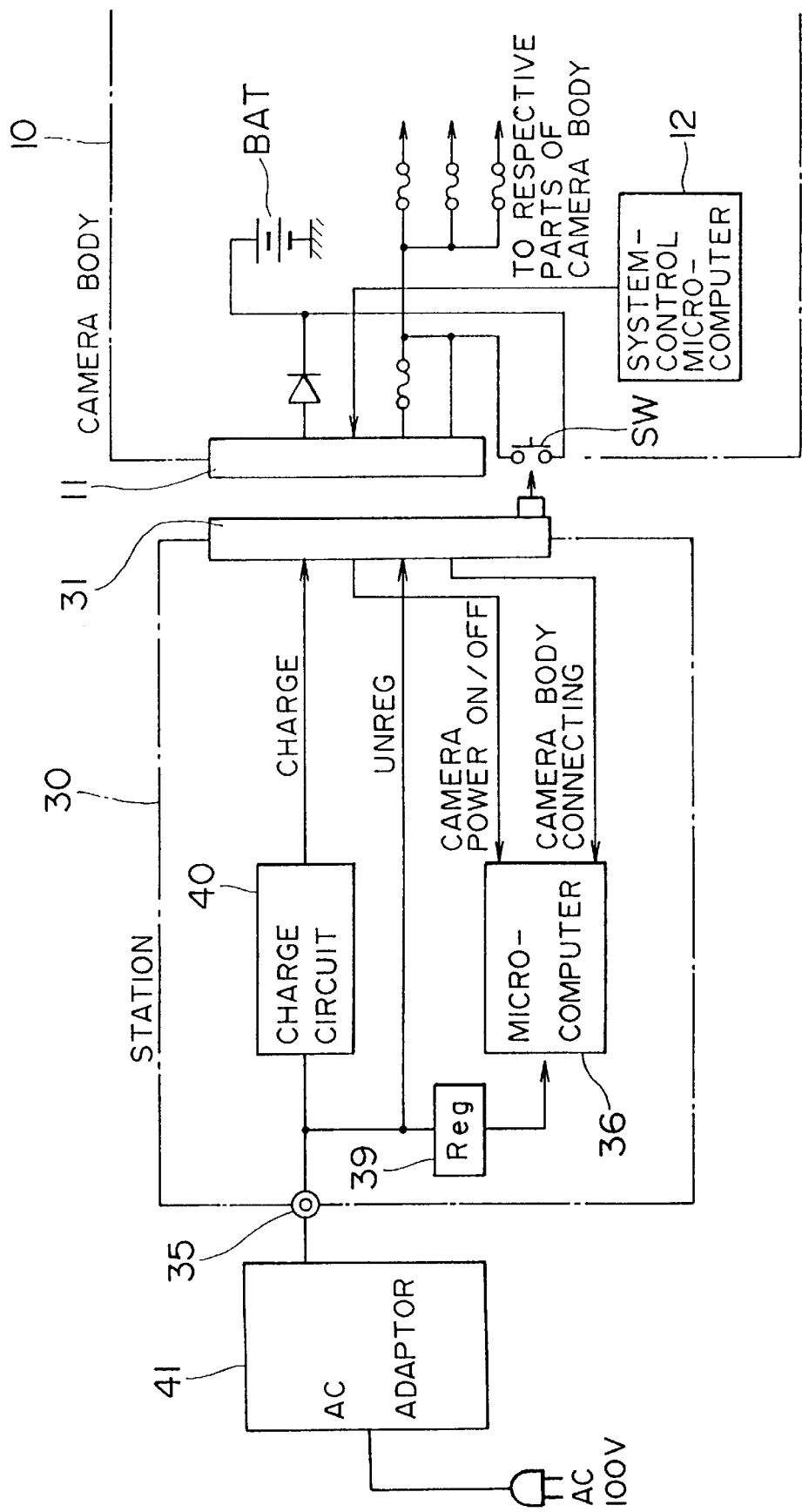
FIG. 5 is a block diagram of supplying the power from the station shown in FIG. 3 to the camera body.

And when the battery 44 is not charged, the microcomputer 43 changes the switch SW3 to a contact B to output power from the AC adaptor 41 directly to the station 30. The station 30 causes the battery BAT (see FIG. 5) of camera body 10 to charge with charging electric current from a charge circuit 40 inputting power from the AC adaptor 41. The charge control is operated because the system-control microcomputer 36 controls switch SW1, SW2. As shown in FIG. 5, when the multi-connector 11 of the camera body 10 is connected to the multi-connector 31 of station 30, the electric current from the AC adaptor 41 is able to be supplied with the camera body 10 because the switch SW OFF takes place to cut off the battery BAT.

Otherwise the station 30 outputs the mode signal to the AC adaptor 41 indicating the video mode in the camera power ON to stop the charging in the AC adaptor 41 The station 30 controls the switch SW1, SW2 to stop the battery in camera body 10 also to charge.

Namely, the station 30 controls the order of priority in which first is the action of camera body 10 and next the rapid charge in AC adaptor 41 and last is the charge of battery in camera body 10. The battery BAT will be capable of charge in spite of the camera body 10 in operation if the AC adaptor 41 has enough electric current capacity.

It will hereafter be explained in detail that the camera power is controlled by the station 30.

The station 30 inputs the power ON/OFF information-(LANC DC) from the camera power ON/OFF recognition terminal as shown in Table 1 (see FIG. 5), thereby the station 30 recognizes the power of camera body 10 is ON or OFF.

When the camera power is changed from OFF to ON, first the mode signal for the video mode is outputted to the AC adaptor 41. And then the LANC I/O terminal outputs a control signal (for "L" level at regular time)(LANC Data) to indicate the power ON. When the control signal is inputted, the camera body 10 is in a state of power ON. The camera power changes to ON before being in the video mode, so that required power source is capable of being supplied from the AC adapter as the foregoing description.

When the camera power is changed from ON to OFF, the control signal (a signal of only "H" level as shown in Table 1) designating the power OFF is outputted from the LANC I/O terminal, thereby the camera body 10 changes to the power OFF.

It will hereafter be explained in detail to close the cassette cover of camera body 10 in the camera power OFF.

Normally, the camera body 10 allows a loading of cassette when a cassette cover is closed to a switch of cassette cover changes from OFF to ON, and the initiative of the control of camera body 10 including the camera power ON/OFF moves to the station 30 as foregoing description when the camera body 10 is connected to the station 30. The control of closing cassette cover in the camera power OFF is performed by the station 30.

Or, when the station 30 inputs the signal showing the closed cassette cover from the cassette cover OPEN/CLOSE detection terminal in the camera power OFF, the camera power is in ON and then the loading of cassette is performed. After the loading is over, the camera power returns to OFF again to be in the former state.

The station 30 consists of a liquid crystal display (LCD) 37, a light emitting diode (LED) 38, so that the system-control microcomputer 36 causes the count value, operation mode and so on to be expressed on the LCD 37 and LED 38 with the control signal inputted through the LANC I/O terminal from the camera body side. A mode memory which is in the camera body 10 memorizes the required operation mode by command of the system-control microcomputer 36 of station 30, so that the camera body 10 can be structured to control the operation mode memorized in the mode memory.

It will hereafter be explained in detail about the connecting of the multi-connector 11 of camera body 10 with a multi-connector 51 of the monitor remote controller 50.

Figure 6:
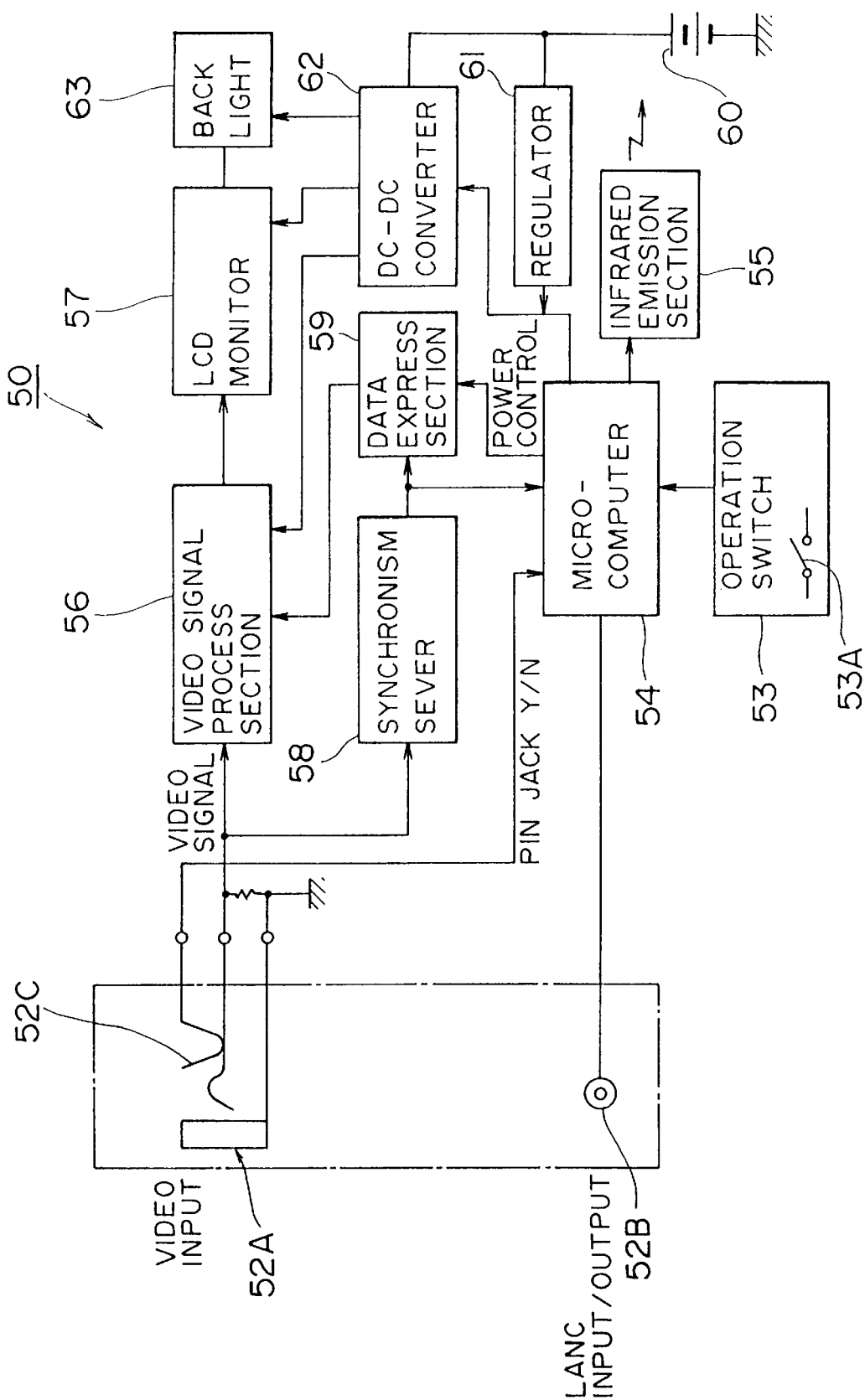
FIG. 6 is a block diagram of one embodiment of the monitor remote controller shown in FIG. 1.
Figure 7:
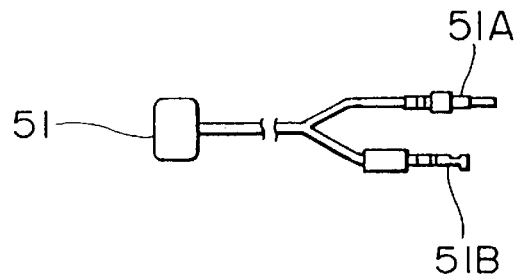
FIG. 7 is a diagram of the connecting cable applied in the monitor remote controller shown in FIG. 6.

The monitor remote controller 50 has a video input RCA terminal(with a connection confirming switch 52C) 52A and a remote control terminal(LANC I/O terminal) 52B as shown in FIG. 6. And the 52A and 52B connect to pin Jack 51A, 51B for connection cable with the multi-connector 51 having the capacity of simple operation connection to the camera body 10 as shown FIG. 7. The multi-connector 51 includes an accessories recognition terminal designating the monitor remote controller 50. The multi-connector 51 instead of terminal 52A, 52B might be directly included.

When the camera body 10 recognizes the monitor remote controller 50 being connected with the multi-connector 11 based on the accessories recognition signal, an operation switch and infrared remote control receiver of the camera body are not able to operate. This is controlled by the control signal from monitor remote control receiver. An audio signal inputting or outputting to the AV terminal of multi-connector 11 is automatically controlled at the camera body side in response to the operation mode of camera body 10 and a video signal which is outputted in a normal line irrespective of the camera/VTR mode.

Referring now to FIG. 6, a power of battery 60 is gained to a regulator 61 and DC-DC converter 62. The regulator 61 produces the reference voltage from inputting power source. The action of DC-DC converter 62 is controlled by the power control signal from the microcomputer 54 to produce, in inactivate state, required voltage by the battery power source to output to a segment circuit of video signal process section 56, a LCD monitor 57 and back light 63.

The microcomputer 54 has the capacity of inputting a signal from the operation switch 53 (including the monitor ON/OFF switch 53A) for operating the camera body 10, a signal to show the existence of pin jack from the connection confirming switch 52C, a synchronism signal severed from the video signal by a synchronism severing circuit 58, a LANC signal from the LANC I/O terminal 52B and so on.

The monitor remote controller 50 does not contain the main power switch, so that power ON/OFF is automatically controlled in accordance with an existence of the connection of RCA terminal 52A, an existence of the video signal I/O from camera body 10 and others as the following description.

Figure 8:
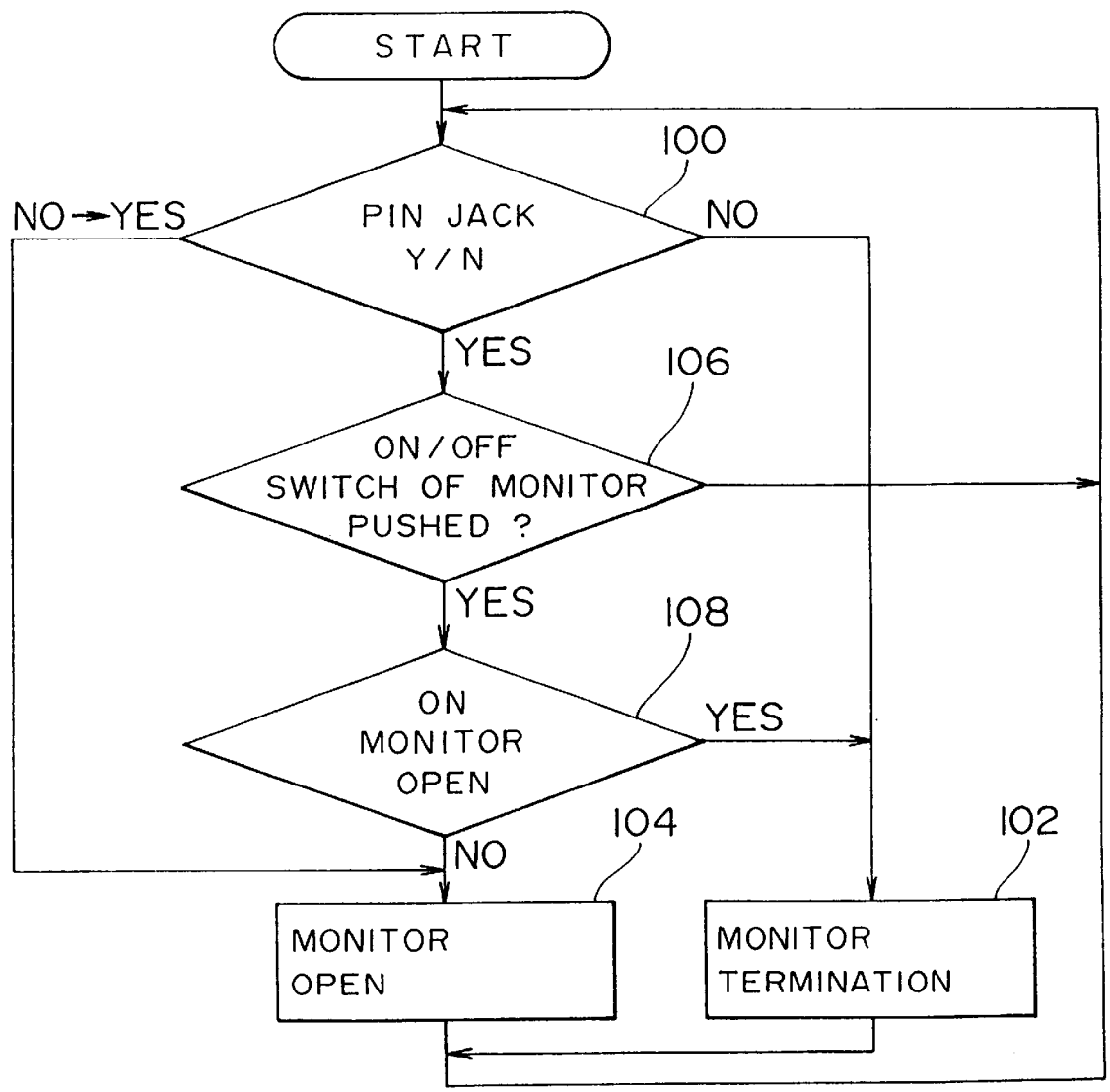
FIG. 8 is a flow chart of the power ON/OFF control in the monitor remote controller shown in FIG. 6.

Referring to a flow chart shown in FIG. 8, the details of the power ON/OFF control of monitor remote controller 50 will hereafter be explained.

As is known from the diagram, the microcomputer 54 distinguishes the existence of pin jack connecting to the RCA terminal 52A based on the signal from connection confirming switch 52C (Step 100). The DC-DC converter 62 becomes incapable of operating to cut the power source to the LCD monitor 57 and so on in the non-connecting of pin jack. Hereinafter, the process refers to a monitor termination (power OFF) (Step 102).

When the changing of pin jack from the non-connecting state to the connecting state is detected, the DC-DC converter 62 can be operated in order that due power source is supplied from the DC-DC converter 62 to the LCD monitor 57 and others and an image is displayed on the LCD monitor 57. Hereinafter, the process refers to as a monitor opening (power ON) (Step 104).

When the connecting state of pin jack is detected, the monitor ON/OFF switch 53A is pushed (Step 106), and the present state is held if it is not pushed. And when the monitor ON/OFF switch 53A is pushed, distinguishing whether the monitor is on opening or not(Step 108), advancing to Step 102 during the monitor opening, terminating the monitor, advancing to Step 104 during the monitor termination, opening the monitor.

The above embodiment in which the monitor power ON/OFF is controlled in accordance with the connecting state of RCA terminal 52A is always not necessary, that is, the monitor power ON/OFF could be controlled in accordance with whether the video signal is inputted from the RCA terminal 52A or the synchronism signal which is inputted from the synchronism severing circuit 58. If the monitor remote controller 50 consists of the same multi-connector as the foregoing multi-connector 31 of the station 30, the monitor remote controller 50 would be able to input the power ON/OFF information (LANC DC) of the camera body side from the camera power ON/OFF recognition terminal of multi-connector as shown in Table 1, so that the monitor power ON/OFF could be controlled by synchronizing with the camera power ON/OFF in accordance with the power ON/OFF information. The present embodiment explains of the remote monitor control. The control of the monitor power ON/OFF can also apply to a monitor without remote control function.

The monitor remote controller 50 has a remote controller operation mode to transmit a remote controller signal from the LANC I/O terminal 52B or an infrared emission 55 and a consumed electric power mode (standby mode) to reduce a consumed electric power by interrupting an oscillation of clock signals of the microcomputer 54.

Figure 9:
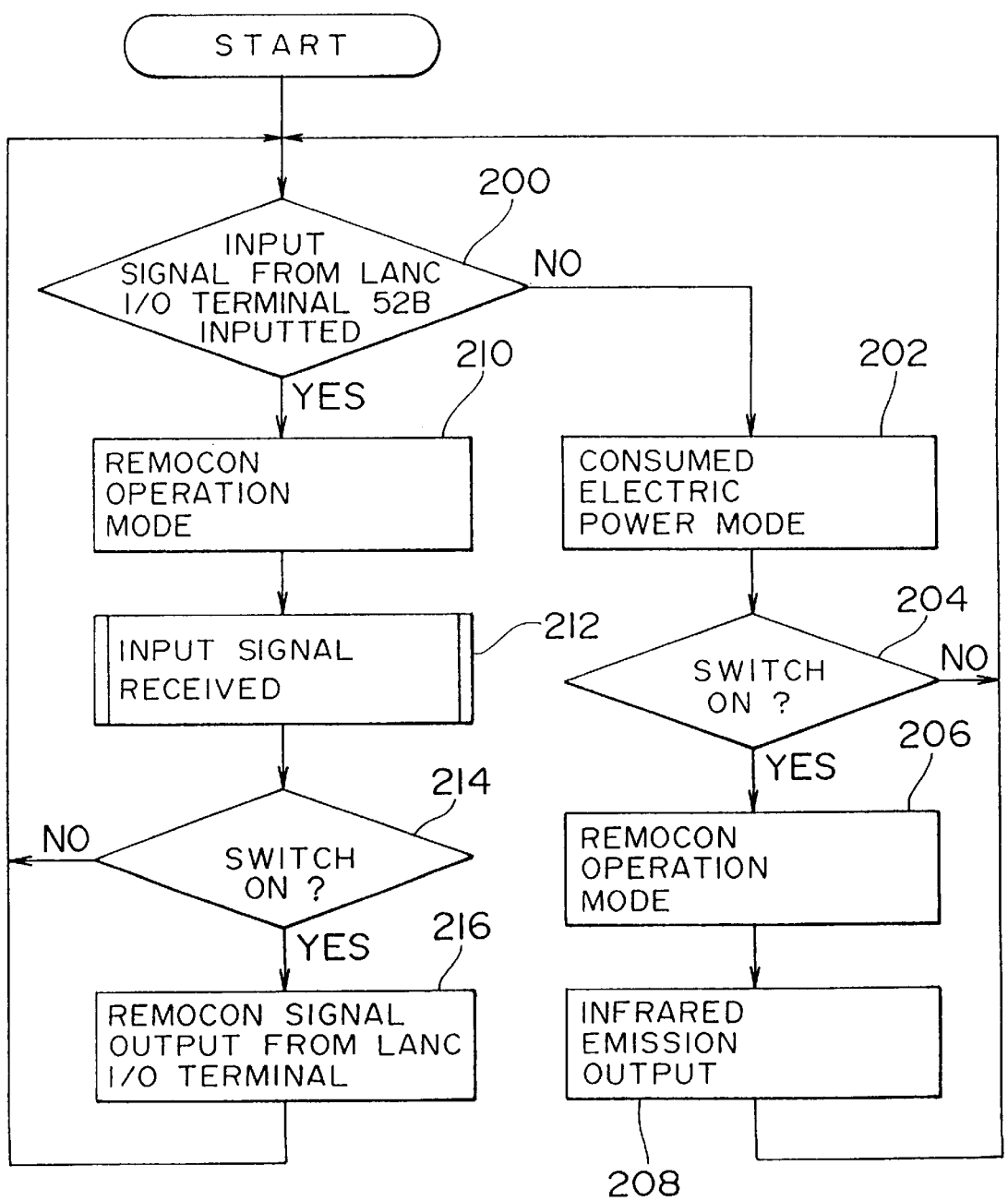
FIG. 9 is a flowchart of the switching control of the wired remote controller and infrared remote controller in the monitor remote controller shown in FIG. 6.

Referring to FIG. 9, it will hereafter be explained in detail by referring to FIG. 9 concerning the switching control of the above consumed electric power mode and the remote controller operation mode.

The monitor remote controller 50 can input the LANC signal from the camera body 10 when the LANC I/O terminal 52B is connected with the LANC I/O terminal on the camera body. The microcomputer 54 of monitor remote controller 50 distinguishes the existence of input signal from the LANC I/O terminal 52B as shown in FIG. 9 (Step 200). With no input signal, the microcomputer 54 interrupts the oscillation of clock signals and causes the mode to be a little consumed electric power mode (Step 202), and distinguishes whether or not the operation switch 53 is operated (Step 204). When the operation switch 53 is not operated, the microcomputer 54 returns back to Step 200.

When the operation of the operation switch 53 is distinguished at Step 204, the microcomputer 54 automatically starts the oscillation of clock signals with the hardware of microcomputer, followed by being in the remote controller operation mode having the ability to transmit the remote controller signal (Step 206), transmitting the remote controller signal corresponding to respective switches operated from the infrared remote controller emission section 55 (Step 208), and returning back to the consumed electric power mode again when the switch operation is completed. The microcomputer 54 changes to the standby mode, that is the state of consumed electric power when the switch operation is not operated.

When the microcomputer 54 detects a signal being transmitted from the LANC I/O terminal 52B (Step 200), and is in the remote controller operation mode (Step 210), executing a process corresponding to the received input signal (Step 212). Namely, the input signal from LANC I/O terminal 52B shows the operation mode of camera body 10 or tape count value, so that the microcomputer 54 outputs a character signal indicating the count value, the operation mode and so on based on the input signal from a data express section 59 to the video signal process section 56, thereby the count value, operation mode and others are superimposed on the screen of the LCD monitor 57.

Continually, the microcomputer 54 distinguishes whether the operation switch 53 is operated (Step 214), turning back to Step 200 when the operation switch 53 is not operated and outputs the remote controller signal which corresponds to the respective sorts of switches operated from the LANC I/O terminal 52B when the operation switch 53 is not operated (Step 216).

In the above-mentioned embodiment, the changeover of a wired remote controller and infrared remote controller is executed by the existence of input signal from the LANC I/O terminal 52B. However, when the remote controller terminal, which is wired and capable of outputting only the remote control signal, is provided instead of the LANC I/O terminal 52B, the changeover of the wired remote controller and the, infrared remote controller can be carried out based on whether the remote control terminal is connected.

It will hereafter be explained in detail that a multi-connector 91 of zoom camera 90 connects with the multi-connector 11 of camera body 10.

The zoom camera 90 is capable of taking a picture in high magnification and has no VTR function, and the multi-connection 91 of the zoom camera 90 consists of the AV terminal to output the video signal and audio signal to the external apparatus, accessories recognition terminal and control signal terminal. When it is recognized that the zoom camera 90 connects with the multi-connector 10 based on the accessories recognition signal of camera body 10, the video signal and audio signal are inputted from the AV terminal of multi-connector 11 and concurrently the control signal is inputted from the control signal terminal of multi-connector 11. Namely, the camera body 10 connects with the zoom camera 90 to function as a video tape recorder and is controlled by the control signal from the operation switch of the zoom camera 90.

The operation switch and infrared remote controller receiver of the camera body side are incapable of working, and the priority is given to the operation switch of zoom camera 90. The camera body 10 in a VTR mode is designed to be capable of edit-searching when connecting with the zoom camera 90. Edit-searching is only possible in the camera mode, not in the normal VTR mode (the VTR mode when the zoom camera is not connected). The power of the zoom camera 90 is supplied from the multi-connector 11 of the camera body 10 through the multi-connector 91 of the zoom camera 90.

The Case of connecting a marine package with the camera body 10 will hereafter be explained in detail.

Figure 10:
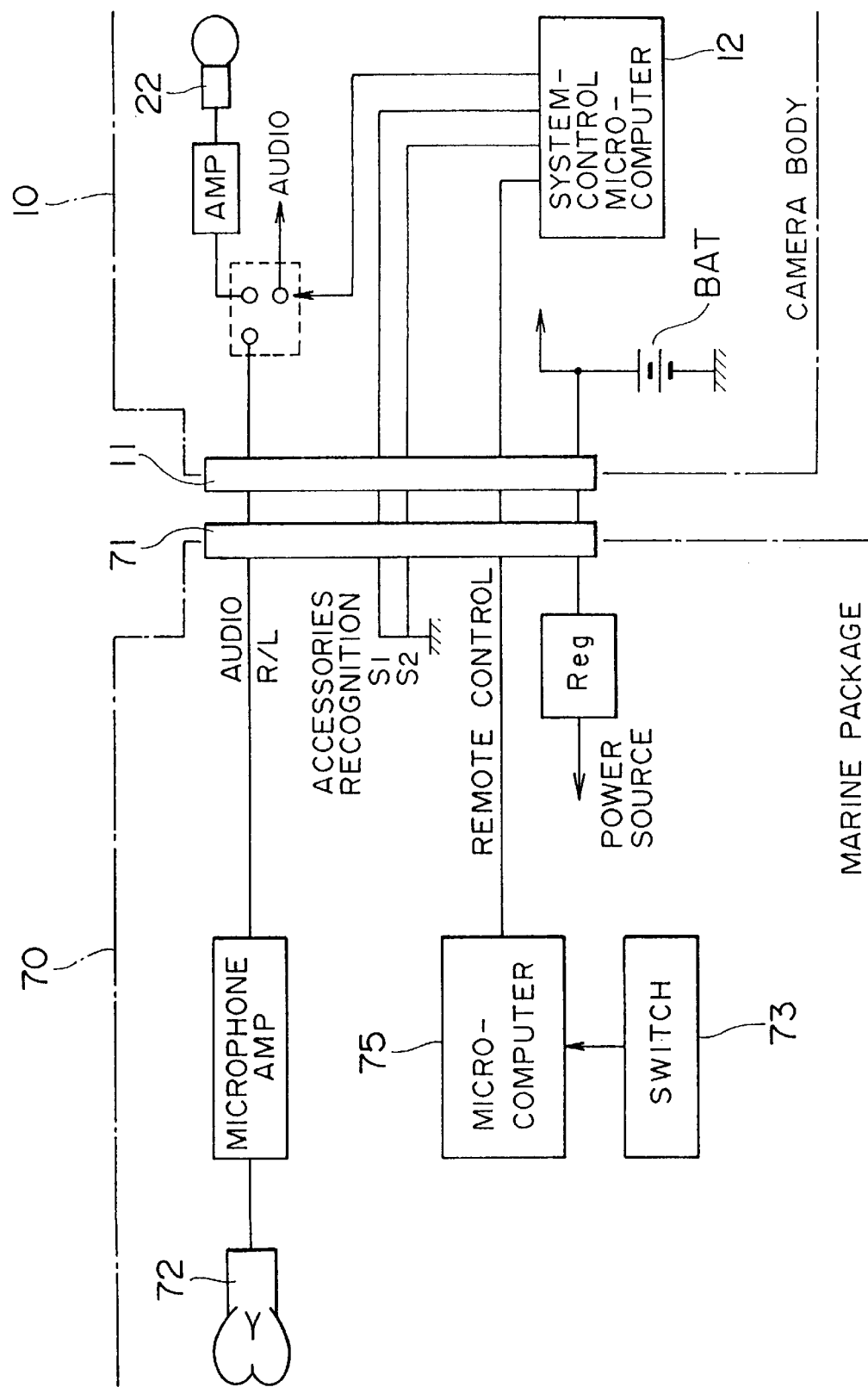
FIG. 10 is a block diagram of one embodiment of the marine package connected with the camera body shown in FIG. 1.

The marine package which has a watertight structure is capable of taking pictures in water by receiving the camera body. As is known from FIG. 10, the marine package 70 includes an external microphone 72 which is different from the internal microphone 22 of camera body 10. The multi-connector 71 of marine package 70 consists of the audio output terminal to output the audio signal from the external microphone 72, the accessories recognition terminal and control signal terminal. When the camera body recognizes that the multi-connector 71 of the marine package 70 is connected to the multi-connector based on the accessories recognition signal as can be seen from FIG. 1, only the camera mode is capable of operating to cause the system-control microcomputer 12 to change from the audio signal of the internal microphone 22 to the audio signal inputted through the multi-connector 11. The video signal uses the signal of the camera body 10.

The operation switch and infrared remote controller receiver of the camera body are not capable of working, and the power ON/OFF, video START/STOP and zoom (tele/wide) of the camera body 10 can be controlled by the control signal outputted from the microcomputer 75 in accordance with the operation of the operation switch 73 of the marine package 70. The marine package 70 is supplied with the electric current through the multi-connector 11 of the camera body 10.

Figure 11:
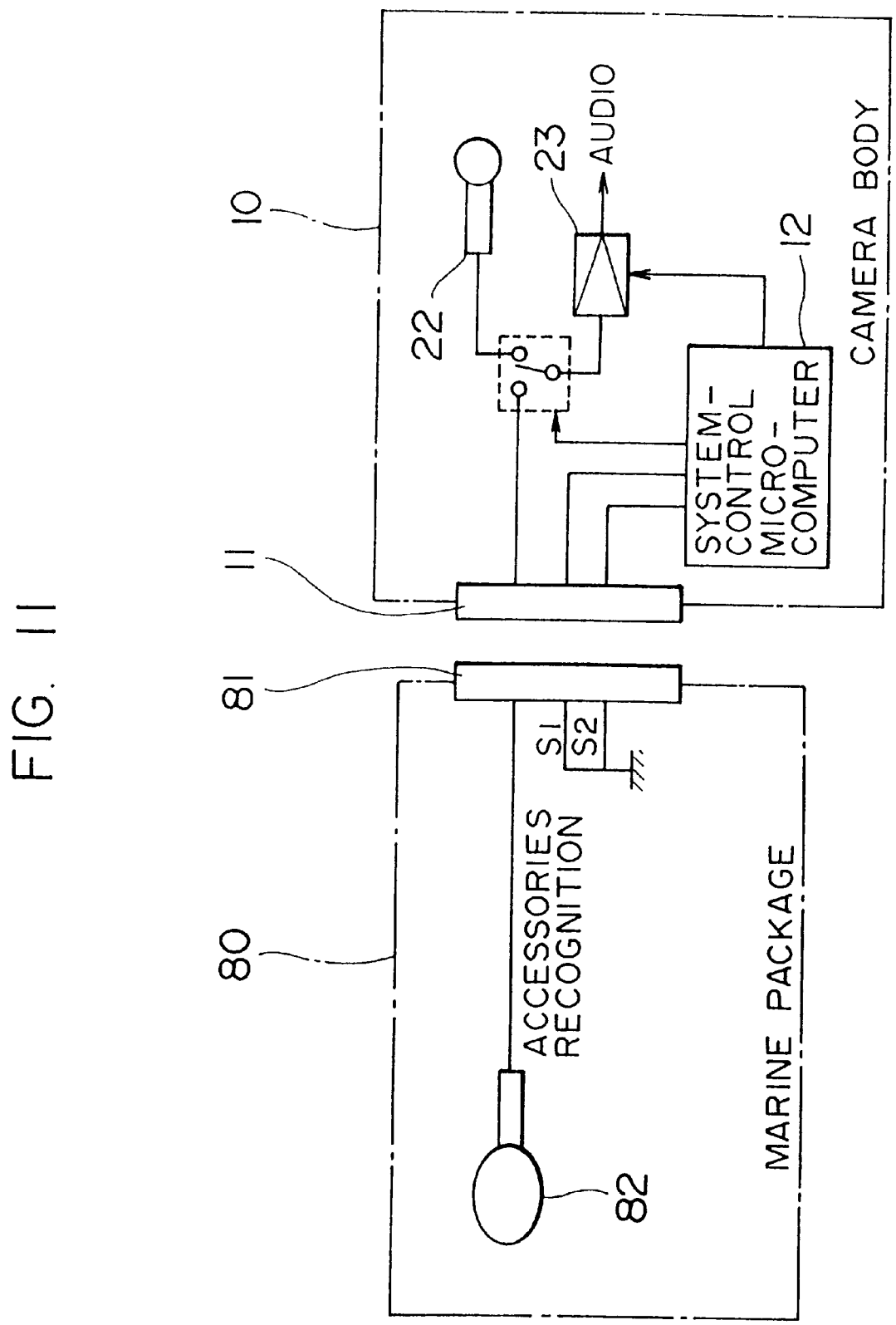
FIG. 11 is a block diagram of other embodiment of the marine package.

FIG. 11 is a diagrammatic view of the other embodiment of the marine package. The marine package 80 excluding the microcomputer and others for the purpose of low cost is structured to be capable of mechanically changing the operation switch ON/OFF of the camera body 10 from the operation switch of the non-shown marine package. An internal amplifier 23 of the camera body is utilized as a microphone amplifier and a microphone utilizes an external microphone 82. The system-control microcomputer 12, however, can control the gain of the amplifier 23 in accordance with the external microphone 82 or the internal microphone 22.

It will hereafter be explained in detail that a multi-connector 301 of the liquid crystal monitor 300 connects to the multi-connector 11 of the camera body 10.

Figure 12:
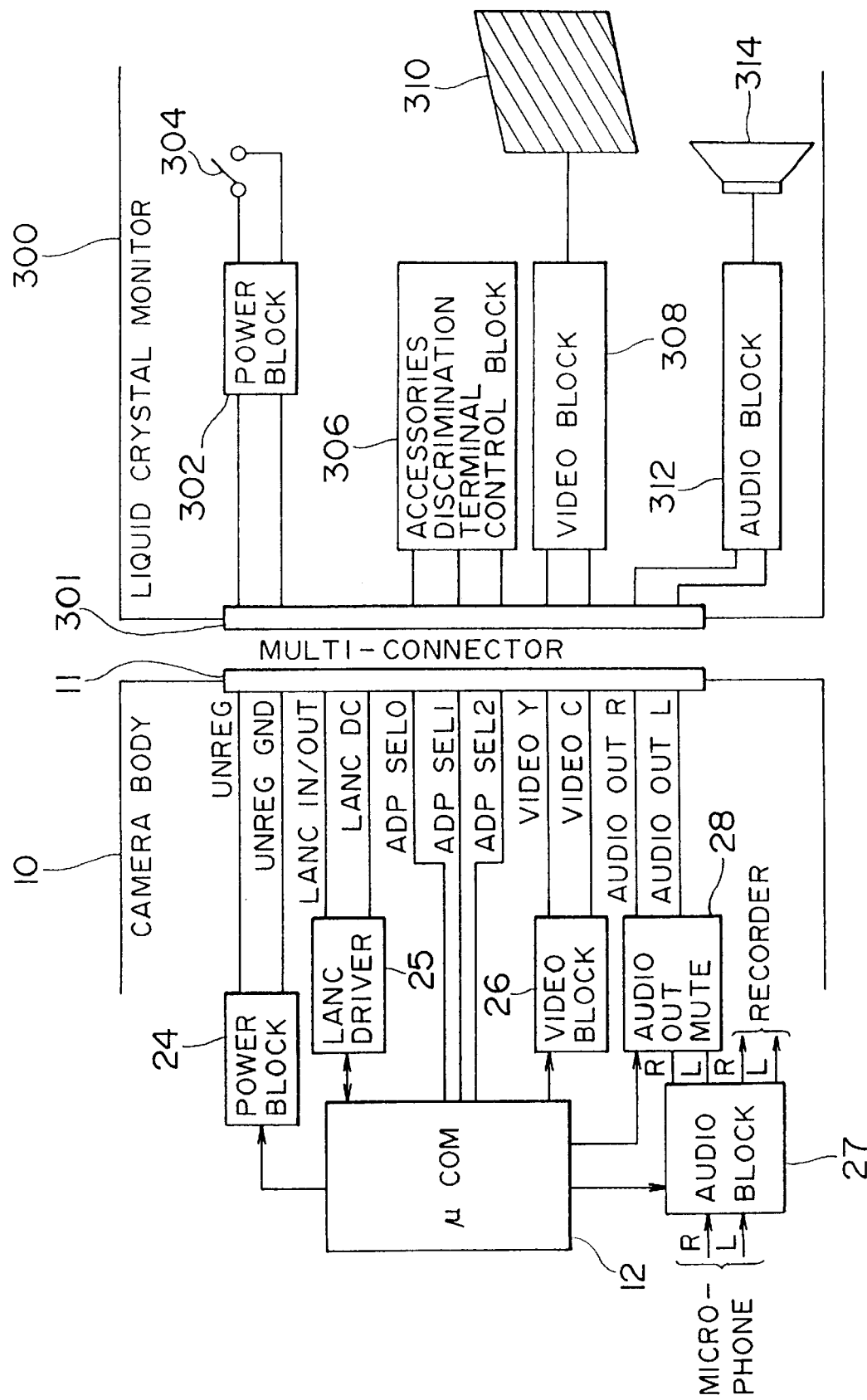
FIG. 12 is a block diagram of one embodiment of the camera body and the liquid crystal monitor connected with the camera body.

As is known from FIG. 12, the liquid crystal monitor 300 is composed mainly of the multi-connector 301, power block 302, accessories discrimination terminal control block 306, video block 308, liquid crystal display section 310, audio block 312 and loudspeaker 314.

The liquid crystal monitor 300 can input the power source, video signal, audio signal and so on from the multi-connector 11 of the camera body 10 and be used as a finder when it is installed in the camera body 10. The power block 302 supplies with the electric current to respective circuits in the liquid crystal monitor 300 and the power is supplied from a power block 24 of camera body 10. Number 304 is a power switch of the liquid crystal monitor.

The accessories discrimination terminal control block 306 outputs the accessories recognition signal (L, L, H) showing the liquid crystal monitor 300 to the accessories recognition terminal (ADP-SEL0, 1,2). The video block 308 drives and controls the liquid crystal display section 310 based on a brightness signal Y and chroma signal C issued from the video block 26 of the camera body 10 in order to display video on the liquid crystal display section 310, and the audio block 312 produces a sound while driving the loudspeaker 314 based on the audio signal R, L issued through a mute circuit 28 of the camera body.

At the same time, the audio block 27 of the camera body 10 processes the audio signal R, L based on the signal sent out from the system-control microcomputer 2, outputs them to a recorder (not shown), and outputs the audio signal R, L to the mute circuit. The mute circuit 28 is capable of muting the audio signal R, L inputted from the audio block 27 based on the signal sent out from the system-control microcomputer 12.

Figure 13:
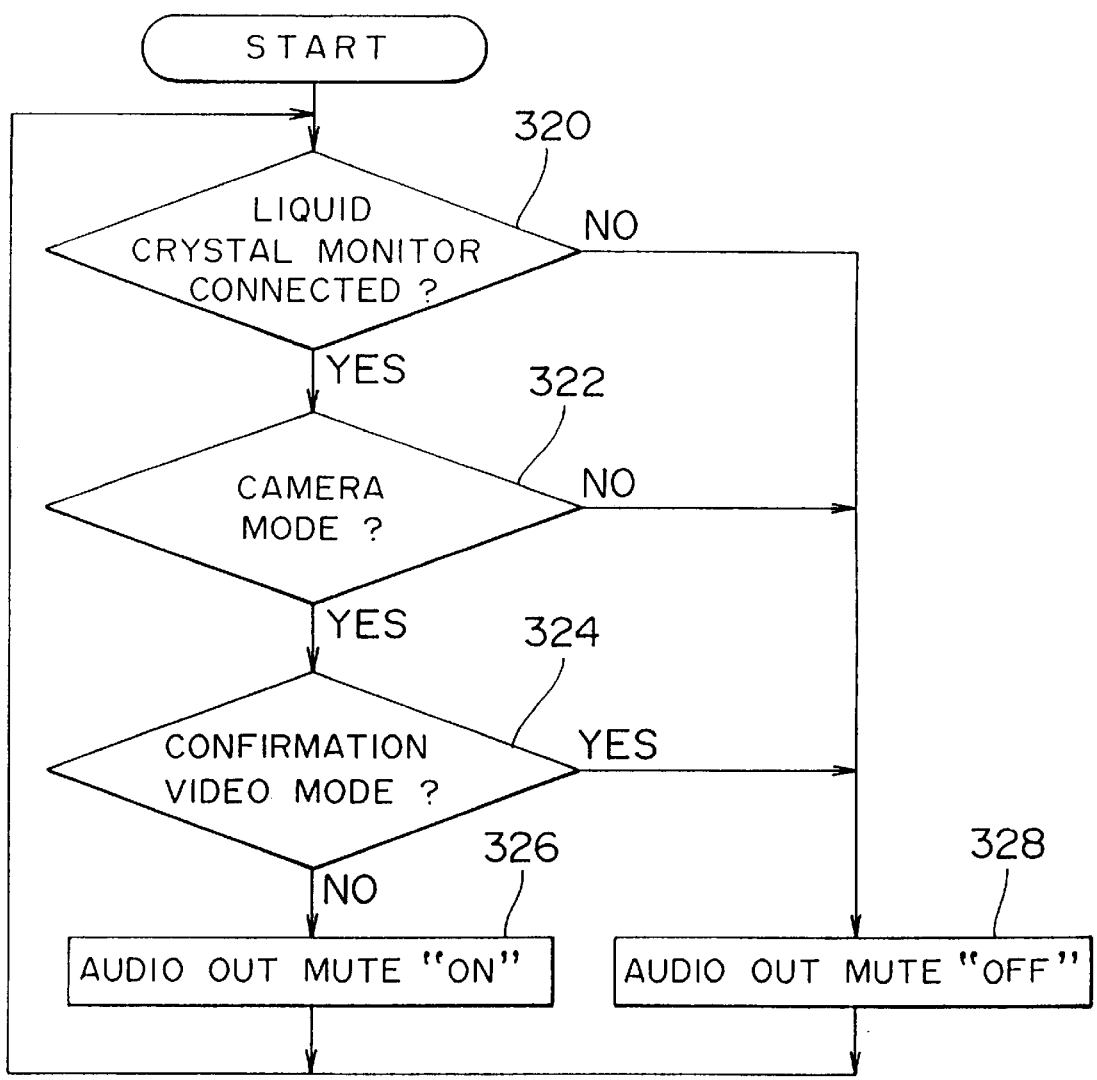
FIG. 13 is a flowchart for explaining the mute control of audio signal on the side of the camera body of FIG. 12.

The audio control of the liquid crystal monitor 300 by the camera body 10 will hereafter be explained in detail referring to the flowchart shown in FIG. 13.

As is shown in the flow chart, the system-control microcomputer 12 of the camera body 10 distinguishes whether the liquid crystal monitor 300 connects to the multi-connector 11 based on the accessories recognition signal inputted through the accessories recognition terminal (ADP-SEL0, 1,2) (Step 320). When the liquid crystal monitor 300 is not connected, the system control microcomputer 12 outputs the audio signal R, L in the mute circuit 28 without muting them. When the liquid crystal monitor 300 is connected, it proceeds to Step 322. 322.

In Step 322, it further distinguishes whether the operation mode of the camera body is in the camera mode to video or not (Step 322). Upon non camera mode (in the case of the VTR mode), the audio signal R, L is outputted in the mute circuit 28 without being muted (Step 328), proceeding to Step 324 upon the camera mode.

In Step 324, it further distinguishes whether the operation mode (an edit-search mode) to confirm taking scene (Step 324). When it is in the edit-search mode, the audio signal R, L are outputted without being muted in the mute circuit 28 (Step 328). When it is not in the edit-search mode, the audio signal R, L are muted by the mute circuit 28 (Step 326).

According to the above-mentioned structure, if the liquid crystal monitor 300 is utilized as, for example, the finder while connecting to the camera body (in short, the camera body is not in the edit-search mode but in the camera mode), the audio signal would be controlled not to output to the liquid crystal monitor 300, thereby the sound of the loudspeaker 314 of the liquid crystal monitor 300 would be muffled to prevent the howling noise in taking scene.

Figure 14:
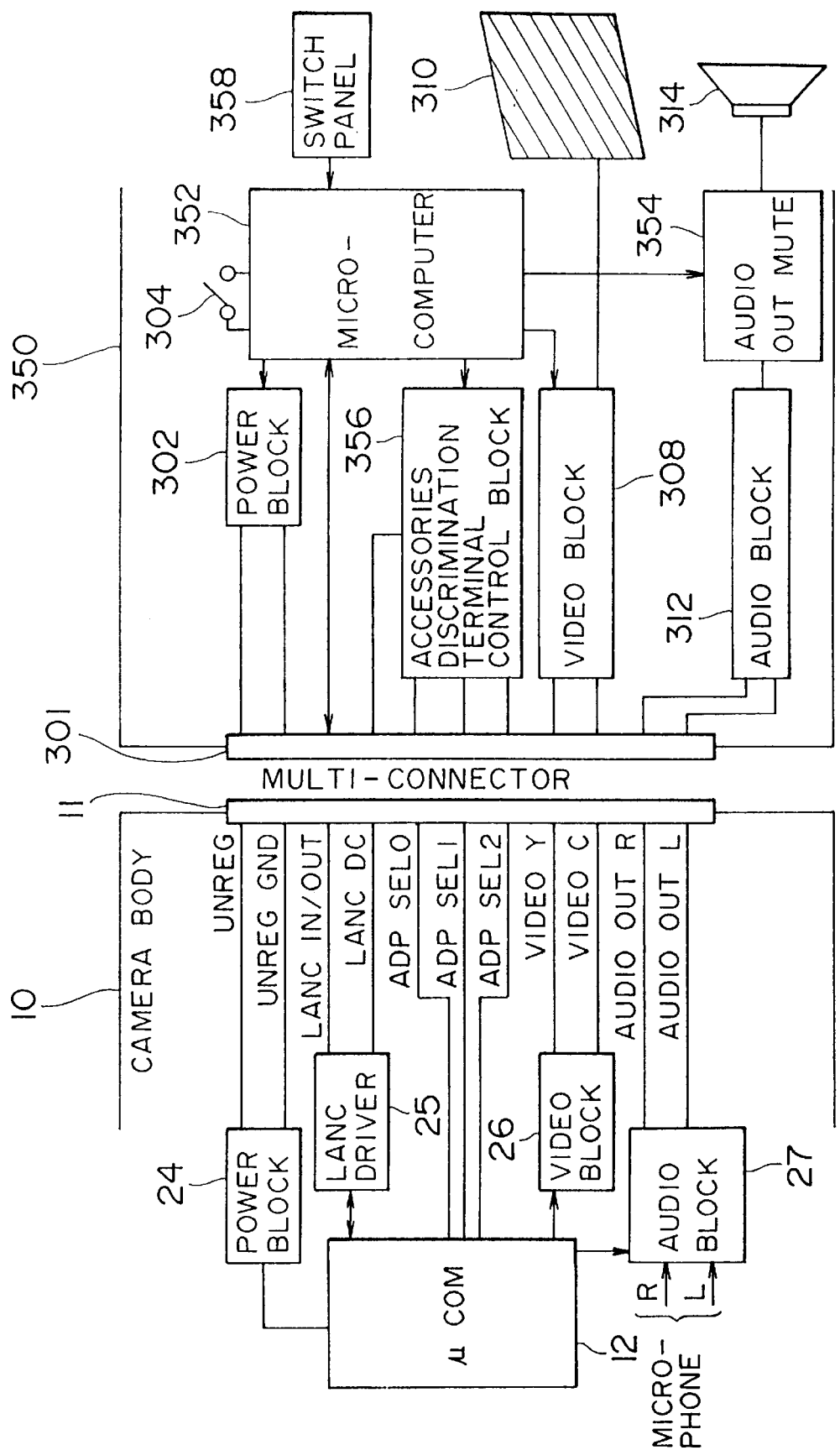
FIG. 14 is a block diagram of other embodiments of the camera body and the liquid crystal monitor connected with the camera body.

FIG. 14 is a block diagram of other embodiments of the camera body and liquid crystal monitor. Using the same symbols in the part common with FIG. 12, a detailed explanation will be omitted.

As is shown in FIG. 14, the camera body 10 is normally structured in that the mute circuit for audio signal outputted to the exterior is not provided, and the side of liquid crystal monitor 350 is provided with a mute circuit 354 controlled by a microcomputer 352.

The microcomputer 352 of the liquid crystal monitor 350 can input a signal which shows the operation mode and others of camera through a LANC driver 25 and LANC I/O terminal of the camera body 10. The microcomputer 352 allows the power block 302 to work only when the power switch 304 is ON, and the accessories recognition signal which shows the liquid crystal monitor. When the power switch 304 changes to OFF, the accessories discrimination terminal control block 356 outputs the accessories recognition signal which means "non accessories", thereby the camera body is capable of working in the power saving mode upon the "non accessories" in spite of connecting to the liquid crystal monitor 350. The microcomputer 352 is capable of controlling the bright or tone on the screen of the liquid crystal display 310 and the volume and others from the loudspeaker 314 by operating a switch panel 358.

Figure 15:
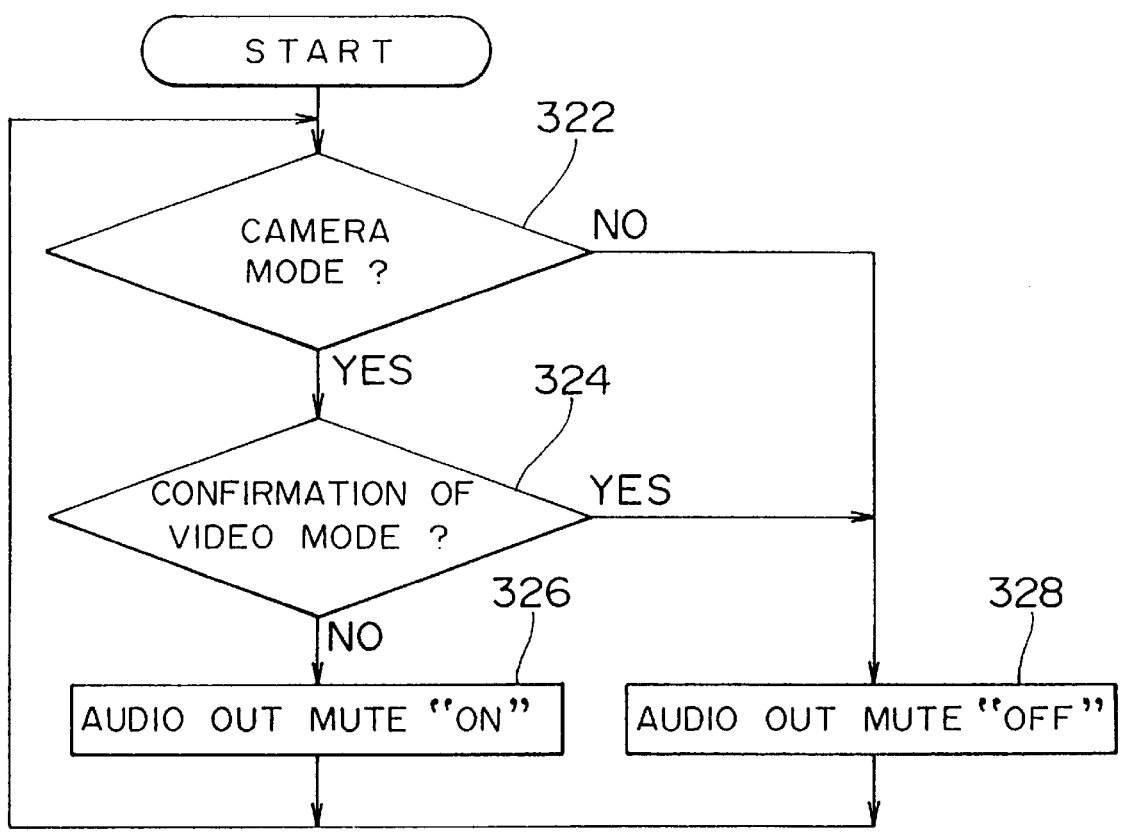
FIG. 15 is a flowchart for explaining the mute control of audio signal on the side of the liquid crystal monitor of FIG. 14.

As mentioned above, the microcomputer 352 can input a signal showing the operation mode and others of the camera through the LANC I/O terminal and thus controls the mute circuit 354 in response to the operation mode of the camera. As is shown from the flow chart in FIG. 15, if the camera body 10 is in the camera mode and, at the same time, in the mode of confirming taking scene based on a signal inputted through the LANC I/O terminal(Step 322, 324), the mute circuit 312 would be controlled not to output the audio signal to the loudspeaker 314 (Step 326), and upon other cases, the mute circuit 312 is controlled so that the audio signal is outputted to the loudspeaker 314 (Step 328).

According to the present invention as foregoing description, the operation will be easy and the operation and manageability of the camera body will be improved because the function to use the camera body is limited in accordance with what sort of accessories are connected, when the function is improved by connecting the camera body and the accessories. It has an advantage of the simplification of the camera body and so on because the accessories has the part of functions of the camera body. The monitor power ON/OFF are controlled based on the relation with the camera body, so that the consumed electric power of the monitor will be reduced. Furthermore, when the liquid crystal monitor is connected as an accessary, the muffle control is executed in taking a picture, so that a user can prevent the howling noise without doing any special operation such as turning down the loud speaker volume, thereby using the liquid crystal monitor as a finder.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A monitor, comprising:
   a video input terminal to input a video signal;
   detection means for detecting a connective state of said video input terminal and a video output terminal of an external apparatus;
   display means for displaying an image based on a video signal inputted from said video input terminal; and
   electric power control means for causing said display means to display the image upon detecting a connective state of said video input terminal by said detection means and for cutting at least a power of said display means if the connective state of said video input terminal is not detected.

2. A monitor according to claim 1, wherein said detection means is a connection confirmation switch to detect whether said video input terminal and the video output terminal of said external apparatus are connected.

3. A monitor according to claim 1, wherein said detection means detects the connective state of said video input terminal based on existence of the video signal inputted from said video input terminal.

4. A monitor according to claim 1, further comprising:
   a control signal terminal to connect with a videocamera;
   an operation switch to operate said videocamera; and
   control signal output means for outputting the control signal of said control signal terminal in accordance with the operation of said operation switch.

5. A monitor according to claim 4, further comprising:
   infrared emission means for emitting an infrared remote controller signal which is exchanged from the control signal in accordance with the operation of said operation switch; and
   control means for operating the control signal output means based on the input signal from either said control signal terminal or said infrared emission means.

6. A monitor according to claim 4, further comprising:
   infrared emission means for emitting an infrared remote controller signal which is exchanged from the control signal in accordance with the operation of said operation switch;
   detection means for detecting a connective state of said control signal terminal; and
   control means for operating said control signal output means based on a detection signal of said detection means or said infrared emission means.

7. A monitor, comprising:

a video input terminal to input a video signal;

a connection detector generating a signal indicative of a connective state of said video input terminal and a video output terminal of an external apparatus;

a display which displays an image based on a video signal inputted from said video input terminal; and an electric power controller which controls a power supply of said display, wherein said electric power controller turns on the power supply to said display in order to display the image when said connection detector detects that said video input terminal and the video output terminal of the external apparatus are connected, and wherein said electric power controller turns off at least the power supply of said display when said connection detector detects that said video input terminal and the video output terminal of the external apparatus are disconnected.

8. A monitor according to claim 7, wherein said connection detector comprises a connection confirmation switch to detect whether said video input terminal and the video output terminal of the external apparatus are connected.

9. A monitor according to claim 7, wherein said connection detector detects the connective state of said video input terminal based on existence of the video signal inputted from said video input terminal.

10. A monitor according to claim 7, further comprising:

a control signal terminal, wherein said control signal terminal is adapted to connect with a videocamera;

an operation switch, wherein said operation switch controls said videocamera; and a control signal output generator which outputs the control signal of said control signal terminal in accordance with the operation of said operation switch.

11. A monitor according to claim 10, further comprising:

an infrared emitter which receives the control signal, which is based on the operation of said operation switch, wherein said infrared emitter emits an infrared remote controller signal in accordance with the control signal; and a controller which operates the control signal output generator based on the input signal from either said control signal terminal or said infrared emitter.

12. A monitor according to claim 10, further comprising:

an infrared emitter which receives the control signal, which is based on the operation of said operation switch, wherein said infrared emitter emits an infrared remote controller signal in accordance with the control signal;

a detector which detects a connective state of said control signal terminal; and a controller which operates said control signal output generator based on a detection signal of said detector or said infrared emitter.

* * * * *